Patented Dec. 22, 1931

1,838,072

UNITED STATES PATENT OFFICE

VICTOR A. RYAN, OF MAPLEWOOD, NEW JERSEY, ASSIGNOR TO THE HARVEL CORPORATION, OF HOBOKEN, NEW JERSEY, A CORPORATION OF NEW JERSEY

REACTION PRODUCTS OF CASHEW NUT SHELL OIL AND PROCESSES THEREFOR

No Drawing.   Application filed April 2, 1927.   Serial No. 180,625.

This invention relates to reaction products of cashew nut shell oil and gums, for example, copal gum, for use in making varnishes and for use in the arts generally. The invention also relates to the method and process for making reaction products of cashew nut shell oil and gums.

An object of this invention is to provide a cheaper and shorter method or process for utilizing gums which hitherto have required excessive temperatures for their preparation for use and which hitherto have been prepared only through processes in which large amounts of the gums were lost through evaporation in the preparation thereof.

Other objects and advantages of the invention will be apparent from the following description in which the invention is fully set forth generally and by particular example, and the invention consists in the methods, processes and products and materials herein set forth and claimed; it being understood that various changes may be made within the scope of the appended claims without departing from the spirit of the invention.

In the preparation of varnishes, lacquers and the like from copal gums and resins such as kauri, manilla, congo etc., it is necessary to heat them for extended periods of time at high temperatures to render the gums and resins miscible with animal and vegetable oils and the usual solvents, and in this heating process for rendering the gums miscible and soluble large proportions thereof are lost through evaporation, for example in the making of a copal varnish it is necessary to heat the copal gum for a number of hours at a temperature around 300° C. and during this heating about one-third of the copal is lost by evaporation.

I have discovered that by mixing the liquid from the shell of the cashew nut, the length of time required to heat the mixture to render the same soluble is considerably less than that heretofore required and that the temperature required to so heat the mixture is only about 200° C. and that the loss by evaporation is substantially nil. I have further discovered that when liquid from the shell of the cashew nut is added the entire product is soluble in the ordinary and usual varnish solvents such as benzine, naphtha, gasoline and the like and that the solution makes a varnish which is useful for the various applications to which varnish is put; for example, coating metal, wood and other materials for indoor use; coating weather resisting articles and for impregnating fabrics, for electrical insulation and for use in the arts generally.

As a particular mixture of cashew nut shell liquid and copal gums and resins, I use, three parts by weight of cashew nut shell liquid and one part of East India resins. The mixture when heated for about ten to twenty minutes at about 200° C. forms a product which is soluble in the cashew nut shell liquid and this mixture is, in turn, soluble in the solvents above mentioned and forms a quick drying varnish. Various other proportions can be used and it is to be understood that I do not limit myself to the exact proportions herein set forth.

The main reason for the difference in solubility of such gums in linseed and other oils and the liquid from the shell surrounding the kernel of the cashew nut is probably that the former is an inert glyceride mixture while the latter contains a large percentage of hydroxyl and carboxyl groups.

It has also been found that a homogenous state may be obtained by heating the liquid from the shell of the cashew nut and said East India gums under pressure. Heating for fifteen minutes at 100 pounds pressure gives desirable results, and the process is not limited to these conditions as other desirable results are obtainable by varying the length of time of heating and the amount of pressure.

While I have given a typical formula I do not limit myself to such formula as it is evident to those having knowledge of the art that other formulas can be employed.

What I claim as new and desire to secure by Letters Patent is:

1. The reaction product of cashew nut shell liquid and a congealed vegetable exudation of the nature of resins.

2. A composition of matter comprising cashew nut shell liquid and a congealed vegetable exudation of the nature of resins.

3. The reaction product of cashew nut shell liquid and a congealed vegetable exudation of the nature of resins, obtained by heating under pressure.

4. A composition of matter which is soluble in a vehicle and which will dry, comprising the reaction product of cashew nut shell liquid and a fossil resin.

5. A composition of matter which is soluble in a vehicle and which will dry, comprising the reaction product obtained by heating a fossil resin and cashew nut shell liquid under pressure.

6. A composition of matter comprising the combination of cashew nut shell liquid and copal gum.

7. A composition of matter which is soluble in a vehicle and which will dry, comprising the reaction product of cashew nut shell liquid and copal.

8. The method of making a composition of matter which comprises heating copal gum and cashew nut shell liquid.

9. The method of making a composition of matter which is soluble in volatile organic solvents which comprises heating copal gum and cashew nut shell liquid.

10. The method of making a composition of matter which is miscible with volatile organic solvents which comprises heating copal gum and cashew nut shell liquid.

11. The method of making a composition of matter which can be taken up with petroleum solvents which comprises heating copal gum and cashew nut shell liquid.

12. The method of making a composition of matter which will set which comprises heating copal gum and cashew nut shell liquid at a temperature of about 200° C.

13. The method of making a composition of matter which comprises heating copal gum and cashew nut shell liquid at a temperature of about 200° C. for about ten to thirty minutes.

14. The process which comprises heating three parts by weight of copal and one part of cashew nut shell liquid at about 200° C.

15. The process which comprises heating together about three parts by weight of copal and one part of cashew nut shell liquid at about 200° C. for about ten to thirty minutes.

16. The process of making a varnish-like composition which comprises heating copal about three parts by weight together with cashew nut shell liquid one part at about 200° C.

17. A composition of matter comprising cashew nut shell oil and a resin dissolved therein of the following group: kauri, congo, manilla and East India gums.

Signed at Irvington, in the county of Essex and State of New Jersey this 26th day of January, A. D. 1927.

VICTOR A. RYAN.